United States Patent [19]
Kurz

[11] 3,906,978

[45] Sept. 23, 1975

[54] CONTROL UNIT FOR AUTOMATIC WATERING OF FLOWERS

[76] Inventor: Reinhard Kurz, 6369 Nidderau 3, Hauptstrasse 6, Germany

[22] Filed: Aug. 21, 1973

[21] Appl. No.: 390,226

[30] Foreign Application Priority Data
Aug. 22, 1972 Germany............................ 2241215

[52] U.S. Cl. ...................... 137/78; 47/48.5; 61/13; 239/63
[51] Int. Cl.² ......................................... A01G 25/00
[58] Field of Search ........ 47/38, 38.1, 48.5; 137/78, 137/593; 61/13, 12; 239/63, 64

[56] References Cited
UNITED STATES PATENTS
1,710,362  4/1929  Korneff............................ 47/48.5 X

*Primary Examiner*—Martin P. Schwadron
*Assistant Examiner*—Richard Gerard
*Attorney, Agent, or Firm*—Bucknam and Archer

[57] ABSTRACT

A control unit for automatic watering of flowers includes a water reservoir connected by a tubular line to a water discharge device to be inserted into the soil. The humidity of the soil is maintained at a constant value by a control unit connected in the line between the water reservoir and the water discharge device. The control unit comprises a volume of air in a closed chamber between two vertical columns of water. The mouth of the supply line enters the closed air chamber at a level higher than that of the opening leading to the discharge device.

8 Claims, 23 Drawing Figures

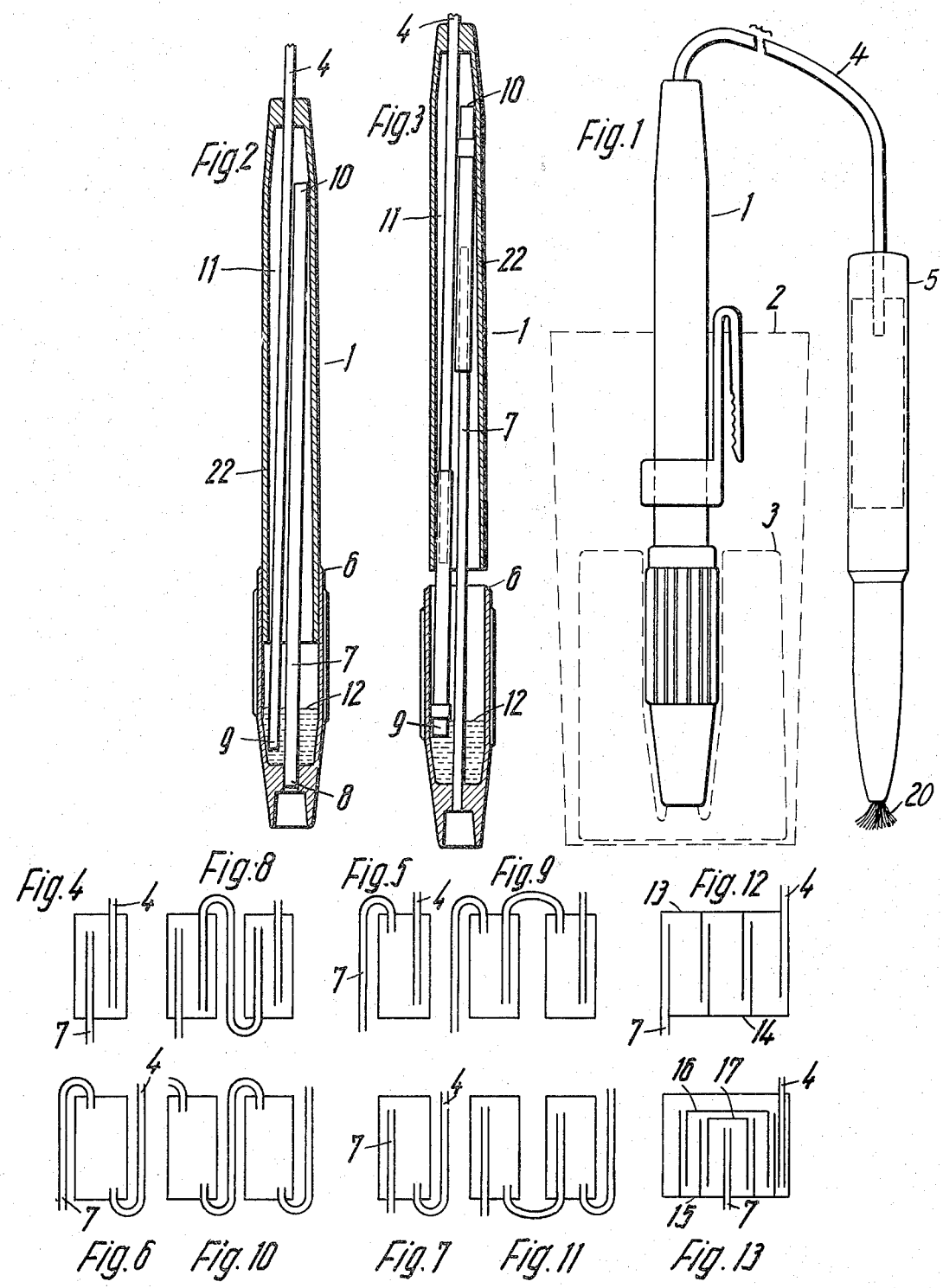

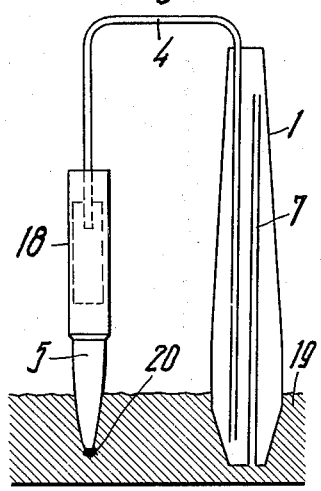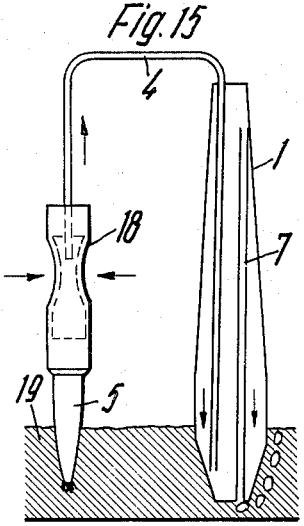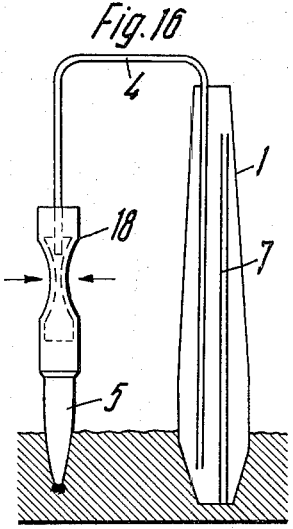
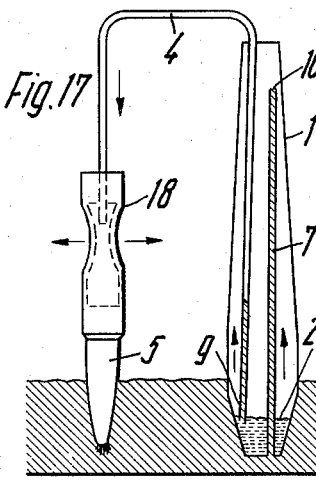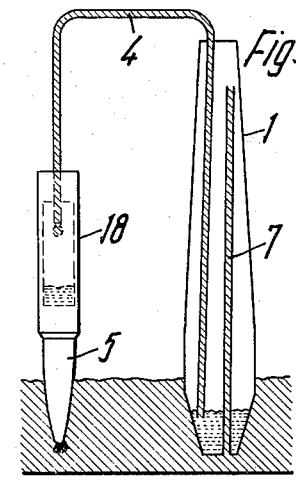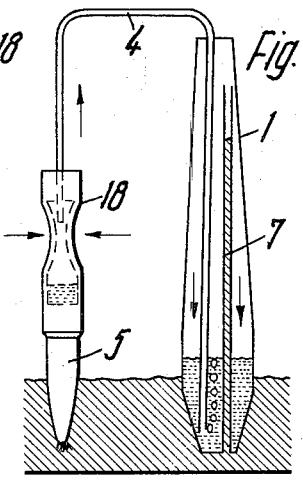
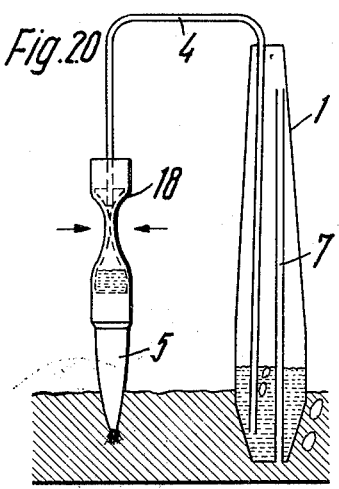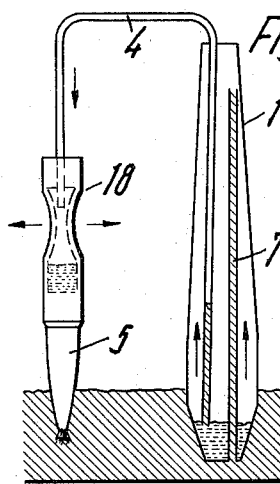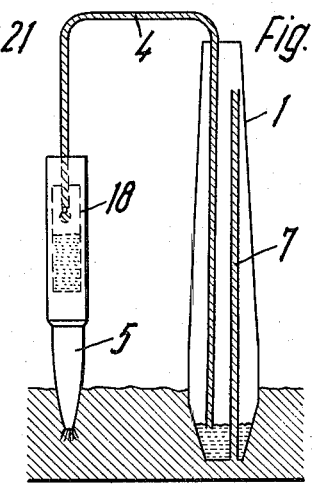

degree of humidity
and saturation of the soil with water in front
of the tip of the water supply device

CONTROL UNIT FOR AUTOMATIC WATERING OF FLOWERS

BACKGROUND OF THE INVENTION

In my pending German Pat. application No. P 22 16 538.4 filed Apr. 6, 1972, I have described an automatic plant watering device comprising a water reservoir which is connected by a flexible tube with a water delivering device adapted to be inserted into the soil.

Said device is provided to guarantee a uniform water supply for a longer period of time which is not interfered with even by algae, material corrosion and other material changes for longer periods of time. The water supply can be controlled and can be adapted to the seasons, the location, temperature, germination and conditions of growth of the plant as well as to water evaporation.

It proved that due to possible insufficient attendance upon the manual control device the degree of humidity of the soil may be either too high or too low. It is therefore important to control the water supply automatically in order to maintain the humidity of the soil at a constant value so that it can be adjusted in advance to the desired degree.

It is known from DAS No. 1 256 937 to use an outer pot to receive and water a flower pot comprising in its inner container a valve to supply water from a water reservoir which is closed by the wet weight of an absorbent body in the inner container, and opened when the body is dry.

SUMMARY OF THE INVENTION

It is therefore an object of the invention to control the water supply in an arrangement referred to above wherein the humidity of the soil is to be maintained constant and wherein the water supply is responsive to the degree of humidity of the soil in such a manner that the water supply adapts itself automatically to the varying conditions.

It is a further object to provide a control device which is simple and reliable in operation, and adapted to be easily connected to the watering device and which allows an easy filling of said device and the connecting tubes.

Extensive experiments have shown that this object can be achieved by a device comprising a water reservoir connected by a tubular line to a water discharge device to be inserted into the soil, a control device connected in the line between the water reservoir and the water discharge device, a closed air path between two vertical water columns, the mouth of the supply line being at a higher level than the opening of the discharge device, whereby the humidity of the soil is maintained constant and the water supply is responsive to the degree of humidity of the soil. In the control unit a constant, adjustable counter-pressure is developed which counteracts the suction effect of the water supply device responsive to the degree of humidity of the soil.

The mouth of the supply line as well as the opening of the line leading to the water supply device are disposed in a closed cavity. In operation, the lines are filled with water, however, the space between the two line ends must not be filled with water to guarantee the mode of operation of the control device.

The water supply device which is preferably a watering tip includes capillary interspaces in the mouth leading to the soil for a constant suction effect so that water is supplied to the soil.

Said water supply to the soil by the control or proportioning device of the German Pat. application No. P 22 16 538.4 is responsive slightly to the degree of humidity and the water saturation of the soil, respectively, i.e. the amount of water supplied per time unit when the soil is dry or when the soil is humid is limited. Even if the soil is almost saturated with water, more water will be supplied so that the supply of water must be adjusted manually.

It was found out that the suction effect, i.e. the suction force of the watering tip through which the water is delivered to the soil is not constant but depends on the humidity of the soil. The suction effect increases from the magnitude when the soil is completely dry with increasing degree of humidity and decreases thereafter and comes to an end when the soil is saturated.

To provide a predetermined air path in the control device has the effect that a constant counter-pressure (opposing pressure differential) or under-pressure counter-acts the suction effect which is developed on the water discharge side. This constant counter-pressure effects an equilibrium between said counter-pressure and the suction force of the water supply side when a predetermined degree of humidity is reached. This regulation effects a weak underpressure in the line leading to the watering tip which interrupts the water supply when the desired degree of humidity is reached, and a re-supply of said evaporated amount of water when the degree of humidity is reduced, i.e. when the evaporation is strong, and a stop of the water supply when the predetermined degree of humidity is reached. The control device maintains therefore the degree of humidity of the soil at a constant level as experiments have shown. The water level in the water reservoir slightly influences the water supply. For the correct operation of the control device, additional factors must be considered, such as the magnitude of the closed cavity, the vertical length of the air path and the diameter of the supply lines as well as the height and the weight of the water column in the supply and discharge tube of the control device.

The lines can be introduced into the closed cavity in different manner depending on whether the lines discharge into the closed cavity from above or from below.

The vertical extension of the air path is preferably adjustable so that it can be adapted to the desired degree of humidity of the soil.

The total air path may be subdivided and thus be formed by series connection of a plurality of air paths arranged side by side. In a continuous air path the control device is preferably a rod-shaped structure having the size of a writing utensil or a fountain pen. When the air path is subdivided the control device may also be a flat box which is composed for instance of two or more plastic members as will be indicated below.

The control device is filled with water so that the lines are filled with water without air inclusions while the interior of the control device does not contain water. For this purpose, the water supply device is provided with a squeezable resiliently deformable member, preferably a cap which is used as a pump. By squeezing said cap which goes back resiliently into its initial position while the watering tip as well as the control device are immersed into the water, the supply lines are filled with water by repeated pumping while the air escapes from the control device. The volume of the suction chamber in the resiliently deformable cap of the watering tip is so dimensioned that it is slightly greater than the contents of the supply paths so that the device is filled by simply squeezing the cap repeatedly.

The automatic control device can be used together with the manual control device of the German Pat. application No. P 22 16 538.4. The device is suitable for any type of soil having a porous structure capable of absorbing water. The device may be used for watering plants growing either in open country or in planting houses. The plants may be planted in a vessel or receptacle, as a flower pot, etc., of different materials.

DESCRIPTION OF THE DRAWINGS

The features of this invention as well as its method of operation will become more apparent from the following detailed description, attached claims and accompanying drawings, in which like characters refer to like parts and in which FIG. 1 is a view of the control device connected with a water discharge device and immersed into a water reservoir FIG. 2 is a longitudinal view of the control device;

FIG. 3 is a sectional view of a different embodiment of the control device wherein the vertical length of the air path is adjustable;

FIGS. 4 to 7 are schematic illustrations of different embodiments of the control device;

FIGS. 8 to 11 are schematic illustrations of control devices with two serially connected air paths each;

FIG. 12 is a schematic illustration of a control device with three air paths arranged side by side;

FIG. 13 is a schematic illustration of a control device with concentric air paths;

FIGS. 14 to 22 illustrate schematically a control device connected to the water supply device and the different stages occurring seriatim during the filling of the control device;

DETAILED DESCRIPTION OF THE INVENTION

Figure 23:
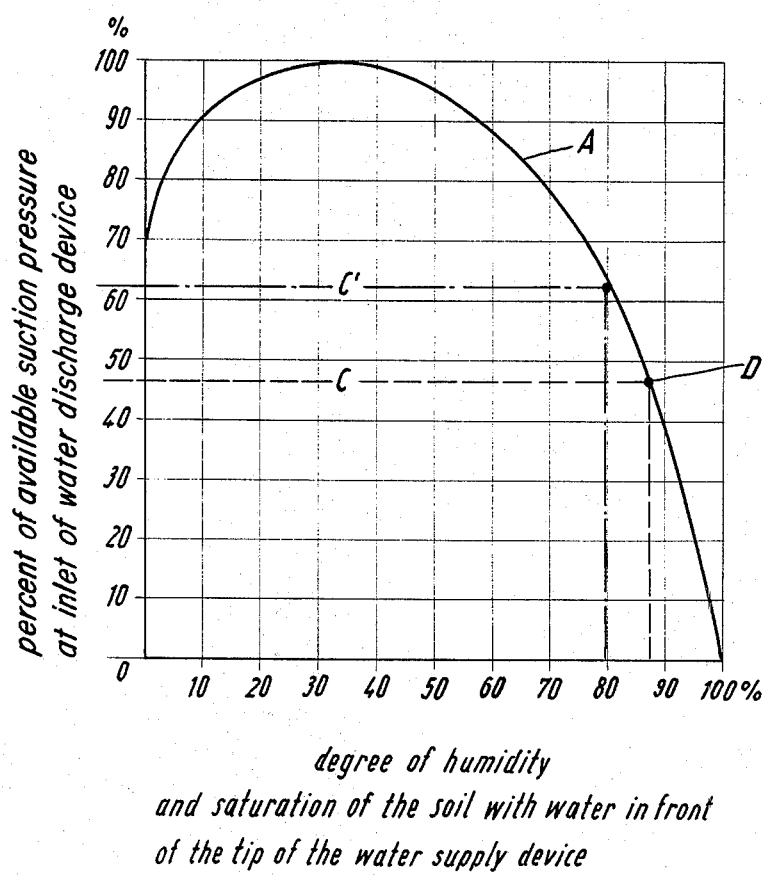
FIG. 23 shows diagrammatically the relation between the suction effect of the water discharge device and the degree of humidity of the soil.

The control device illustrated in FIG. 1 is disposed in a housing 1 with the magnitude and appearance of a fountain pen. The control device immerses into a water reservoir, e.g. a cup 2 containing a filter 3 to support the control device 1. The control device is connected by a tube 4 with the water supply device 5 which is a watering tip and formed in a similar or equal way as described in the German Pat. application No. P 22 16 538.4. The narrowest portion of the supply channel extending through said tip is provided at the mouth of the outlet, and the cross section of the mouth comprises a plurality of capillary interspaces of non-swelling and chemically as well as physiologically neutral material so that a water surface is developed immediately before the mouth of the outlet and the effect of gravity of the water column behind the outlet is balanced by the wetting-out property and the surface tension. The embodiment illustrated provides a fibre strand 20 of a large amount of thin fibres in the mouth of the tip delivering the water to the soil around the tip when the tip is lowered into the soil.

The control device 1 comprises a hollow cylindrical shaft 22, through the upper end of which the flexible tube 4 extends in an air-tight manner. The lower end of the shaft 22 is connected with a sleeve-shaped body 6, through the lower end of which a tube 7 extends in an air-tight manner into an aperture 8. The shaft 22 fits into the sleeve 6 and is air-tightly connected therewith. The lower end of the sleeve 6 is provided with a recess allowing the entrance of water into the tube 7 when the control device 1 is immersed in the water reservoir 2.

The tube 4 extends so far into the control device that its mouth is disposed near the lower end of the control device. The tube 7 extends so far upwardly into the control device that its mouth 10 is disposed far above the mouth 9 of the tube 4.

When the control device 1 immerses in the reservoir 2 filled with water and the tubes 4 and 7 are filled with water, while the cavity 11 of the control device is filled with air, and when a suction pull occurs at the mouth of the watering tip the water level 12 at the lower end of the control device is lowered. The water is sucked from the reservoir through the tube 7, is discharged through the mouth 10 and flows downwardly in the cavity 11 so that the water level 12 is substantially maintained.

In order to explain the mode of operation reference is made to the diagram of FIG. 23. It illustrates the suction effect of the water discharge device in percent in response to the degree of humidity of the soil also in percent. Line A illustrates that the suction effect is about 70% when the soil is dry. When the degree of humidity is 30% it reaches the value of 100% and decreases continuously until it would reach a value ZERO in case of full saturation. By the control device a predetermined underpressure of constant magnitude counteracting the suction effect is developed with the effect that the resulting suction effect comes to an end at the point D of curve A for a counter-pressure indicated by line C′. Thus, for example, when a degree of humidity of 87% is reached the water supply stops. When a higher counter-pressure is chosen as illustrated for instance by line C′, the water supply would be interrupted already when the degree of humidity is 80%. It becomes evident that the height, i.e. the vertical extension of the air path between the mouth 10 and the liquid level 12 can be adjusted in such a manner that the desired degree of humidity is maintained automatically.

As can be noted from FIG. 23, the suction pressure at the water discharge device varies in accordance with the humidity of soil, and for a given water discharge device construction there will be a maximum suction pressure or force when the soil humidity is about 30 percent. For soil humidities between 0 and 30 percent, the suction pressure at the discharge device will increase from about 70 percent of the maximum obtainable suction pressure to the full obtainable suction pressure. At soil humidities above 30 percent, the suction pressure at the water discharge device will decrease until it reaches 0 at 100 percent soil humidity. The control device 1 operates to provide a counteracting suction force, the magnitude of which depends upon the height between the water level 12 and the mouth 10 of tube 7. This height can be conveniently called an air path height, although it will be understood by the artisan that the difference is actually between two liquid levels, i.e. water level 12 and the water level at mouth 10. By setting the opposing suction force created by the control device 1, it is, therefore, possible to regulate the outflow from the water discharge device so as to maintain a constant humidity. As would be appreciated by the artisan, whenever the opposing suction pressure, or force, exerted by control device 1 is less than the suction produced at the discharge device, there will be an outflow of water from the discharge device into the soil increasing the humidity thereof. Whenever the suction created by the control device 1 is equal to that at the water discharge device, the outflow of water from the discharge device will stop because an equilibrium exists. As soon as the humidity in the soil should change and thereby raise the suction at the discharge device, there will be a resumption of water flow out of the discharge device until the humidity is again reached it produces suction equilibrium between the control device 1 and water discharge device.

The shape of the curve A in FIG. 23 depends on the type of soil and on the construction of the water supply device. FIG. 23 is only meant to illustrate the principle of the mode of operation of the control device.

In the embodiment according to FIG. 3 the height of the air path between the water level 12 and the mouth 10 of the tube 7 is adjustable by shifting the shaft 22 upwardly and downwardly in the sleeve 6. The tube lines 11 and 7 are provided with telescopically shiftable portions. When the shaft 22 is shifted upwardly or downwardly, the telescopic tube portions slide into one another. Thus the distance between the mouth 10 and the mouth 9 is varied accordingly.

FIGS. 4 to 7 illustrate different possibilities how to connect the tube lines with the cavity of the air path closed towards outside. FIG. 4 corresponds with the example represented in FIG. 2.

FIG. 5 illustrates how the supply line 7 coming from the water reservoir 2 discharges at the upper side into the container, while the discharge line 4 is inserted into the container as illustrated in FIG. 4.

According to FIG. 6, the discharge line 4 is introduced into the container from below, while the supply 7 discharges into the container from above.

In FIG. 7, the supply line 7 is introduced from below similar to the arrangement illustrated in FIG. 4, while the discharge line 4 also discharges from below into the cavity.

According to FIGS. 8 to 11 a plurality of air paths can be connected in series so that a total air path is reached having a height which is equal to the sum of the individual air paths.

FIG. 8 corresponds to the arrangement shown in FIG. 4

FIG. 9 corresponds to the arrangement shown in FIG. 5

FIG. 10 corresponds to the arrangement shown in FIG. 6 and FIG. 11 corresponds to the arrangement shown in FIG. 7

In practice, according to FIG. 12, the different serially connected air paths can be formed by means of two simple bodies. The upper body 13 and the lower body 14 fit into one another and are interconnected in such a manner that three air paths are defined, wherein the line 7 coming from the water reservoir is inserted from the left lower side and the line 4 comes out at the right upper side.

The control device may also be formed of concentric cup-shaped members as illustrated in FIG. 3. Cup-shaped members 16 and 17 are inserted into a housing 15 in concentric relationship to the central supply line 7, while the discharge line 4 comes out at the right hand side.

In order to explain the filling process of the control device reference is made to FIGS. 14 to 22. As said Figures illustrate, the watering tip 5 is provided with a hollow resiliently deformable plastic cap 18 connected to the tube 4 and can be squeezed outside manually. The cap 18 is so resilient that it resumes automatically its cylindrical form after the squeezing.

For the filling process, the watering tip 5 as well as the control device 1 are immersed into the water 19 as illustrated in FIG. 14.

When, according to FIG. 15, the cap 18 is squeezed, the air is displaced inside the cap 18. As the resistance in the tube 4 and in the control device is smaller than in the strand 20 of fibres of the watering tip 5, air escapes at the lower end of the tube line 7 from the control device 1, as illustrated in FIG. 15.

FIG. 16 shows the cap 18 in its fully squeezed state. When the cap is released, it expands according to FIG. 17 and air is sucked in through the line 4. Water is sucked upwardly through the line 7, discharged at the mouth 10 and flows downward in the cavity of the control device so that a small supply of water is formed at the lower end. Consequently, water is sucked upwardly through the mouth 9 of the line 4. When, according to FIG. 18, the cap 18 is fully expanded, the lines 4 and 7 are filled with water and also the lower part of the tip 5 contains a certain supply of water.

The pumping process is repeated as shown in FIGS. 19, 20, and 21. The water level in the watering tip 5 rises as shown in FIG. 22. This pumping process may be repeated, if necessary, several times. It is important that the water level in the lower part of the control device rises and lowers in rhythm with the pumping process, but that the air escapes through opening 8 as illustrated especially in FIG. 19 and 20. The filling process is continued until the water level inside the cap 18 is sufficiently high. It is desirable that the mouth of the line 4 does not immerse in the water of the tip to prevent the control device 1 from being filled with water by the pumping process so that observation through the transparent cap allows the operator to see how water drops from the line 4 when it is sucked in.

In order to guarantee a satisfactory filling and operation of the control device, it is important to dimension exactly the volume ratios inside the cap as well as inside the tube lines 4 to 7. The volume in the interior of the resiliently deformable cap 18 must be greater than that of the tubes 4 and 7. The volume of the cavity 11 must be great enough to allow the water to flow off during the pumping process and to collect in the lower part of the cavity 11.

When the cavity 11 is too small, it must be expected that the cavity of the control device is filled entirely with water, whereby the control effect would be negative. When the cavity 11 is too large, the pumping process becomes difficult due to the elasticity of the air.

When the volume of the tube 7 is too large in comparison with the cavity of the cap 18, it is impossible to press air out of the tube so that water does not enter the control device. When the volume of the tube 7 is too small in comparison with the volume of the cap, the water level inside the control device becomes too high.

When the pumping process is repeated, the interior of the control device is filled entirely with water.

When the volume of the tube 4 is too large, the air in the tube 4 does not fully escape into the control device during the process illustrated in FIG. 19. The cavity 18 cannot be filled.

However, when the volume of the tube 4 is relatively small, this is not disadvantageous for the filling process, but the pumping process is made difficult thereby.

The control device may also be used as a measuring instrument when an indicating instrument is incorporated between the water supply device 5 and the control device 1.

What is claimed is:

1. A device for controllably suppling a liquid to a porous medium to maintain a given degree of humidification therein which comprises a feeder means having an inlet for receiving liquid to be supplied to the porous medium and capillary means disposed for contact with said medium to diffuse into said medium the liquid received, said capillary means being responsive to the absorption characteristic of the medium to establish a pressure differential in accordance with the degree of humidification of the medium whereby the pressure of the liquid at the inlet of the feeder means tends to establish an outflow of liquid therefrom into the medium; and regulator means having an enclosed chamber, a first conduit communicating with a source of liquid and extending into said chamber to deliver liquid therein, and a second conduit communicating with the inlet of said feeder means and extending into said chamber to deliver liquid therefrom to said feeder means, said first conduit having an outlet within the chamber positioned in elevation spaced relation to an inlet of said second conduit within the chamber to establish a pressure differential opposing and counter-balancing that established by said capillary means at said given degree of porous medium humidification to be maintained.

2. A device according to claim 1 including a length of flexible conduit communicating the inlet of said feeder means with said second conduit of the regulator means.

3. A device according to claim 1 wherein the inlet of said second conduit is positioned below the outlet of said first conduit by a distance accommodating the maintenance within said chamber of a gas space above the liquid level, the outlet of the first conduit being in the gas space and the inlet of the second conduit being submerged below said liquid level, whereby the magnitude of the opposing pressure differential established corresponds to the gas space elevation difference between said liquid level and the outlet of the first conduit.

4. A device according to claim 3 wherein said chamber is defined by an elongated housing having a lower opening communicating with said first conduit for supplying liquid thereto from an external source, said first conduit being disposed within the housing in sealing relation with said opening to define an enclosed chamber.

5. A device according to claim 3 wherein at least one of said first and second conduits is adjustable in elevation relative to the other to correspondingly vary the magnitude of the opposing pressure differential established and thereby adjust the degree of porous medium humidification maintained.

6. A device according to claim 3 wherein said chamber is defined by a housing having a plurality of separated compartments communicated in series by liquid trap flow path means accommodating the maintenance within each compartment of a gas space column about a liquid level, said first conduit extending into the gas space of the first compartment in said series, and said second conduit extending into the last in the series of said compartments whereby the magnitude of the opposing pressure differential established corresponds to the sum of the effective gas column heights of said compartments.

7. A device according to claim 6 wherein said housing has a plurality of compartments arranged side-by-side.

8. A device according to claim 6 wherein said housing has a plurality of concentric cup-shaped compartments.

* * * * *